United States Patent [19]

Nakagawa et al.

[11] Patent Number: 5,358,772

[45] Date of Patent: Oct. 25, 1994

[54] INDICATION LABEL TO BE ADHERED TO RUBBER TIRE AND MATERIAL OF LABEL

[75] Inventors: Shunji Nakagawa, Takahama; Takuya Mizuta, Akashi; Ryuji Morimura, Iruma; Tadao Nishikawa, Higashimatsuyama, all of Japan

[73] Assignee: Sumitomo Rubber Industries, Ltd., Hyogo, Japan

[21] Appl. No.: 64,989

[22] Filed: May 24, 1993

[30] Foreign Application Priority Data

May 25, 1992 [JP] Japan ................. 4-034618[U]

[51] Int. Cl.$^5$ ............................................. C09J 7/02
[52] U.S. Cl. ..................... 428/148; 428/149; 428/354
[58] Field of Search ............. 428/354, 40, 148, 149

[56] References Cited

U.S. PATENT DOCUMENTS

| | | | |
|---|---|---|---|
| 4,098,935 | 7/1978 | Knudsen | 428/354 |
| 4,256,159 | 3/1981 | Williams | 428/40 |
| 4,772,512 | 9/1988 | Nagafuchi | 428/343 |

FOREIGN PATENT DOCUMENTS

| | | |
|---|---|---|
| 0212538 | 3/1987 | European Pat. Off. . |
| 0237258 | 9/1987 | European Pat. Off. . |
| 0254923 | 2/1988 | European Pat. Off. . |
| 0369023 | 5/1990 | European Pat. Off. . |
| 0409598 | 1/1991 | European Pat. Off. . |
| 53-29595 | 8/1978 | Japan . |
| 54-16636 | 6/1979 | Japan . |
| 62-3814 | 1/1987 | Japan . |
| 63-42263 | 8/1988 | Japan . |
| 2006692 | 5/1979 | United Kingdom . |

OTHER PUBLICATIONS

Derwent Publications Ltd., London, GB; AN 90-198347 & JP-A-2 132 487 (Oji Yuka Goseishi KK.) 21 May 1990 *abstract*.

Primary Examiner—Jenna L. Davis

[57] ABSTRACT

A material for an indication label to be adhered to a rubber tire. The label is designed to be disposed on an unvulcanized raw rubber tire and then fixed to the finished tire by vulcanization using heat and pressure. The indication label having a label base material with a heat-resistant plastic film and an abrasive surface coating layer formed on the upper surface of the plastic film. The abrasive surface being composed of a hardened resin and filler. An indication defined by an ink layer is disposed on the abrasive surface. A rubber adhesive laminated on the lower surface of the plastic film adheres the label to the tire. The label is constructed by forming the ink layer on the exterior side of the abrasive surface coating layer. The abrasive surface having a profile and roughness for preserving the quality of the indication.

2 Claims, 2 Drawing Sheets

INDICATION LABEL TO BE ADHERED TO RUBBER TIRE AND MATERIAL OF LABEL

BACKGROUND OF THE INVENTION

The present invention relates to a label which can be permanently adhered to a rubber tire such as an automobile tire or an airplane tire and more particularly to an indication label material on which an indication such as a bar code can be printed by using a thermal transfer printer and a label on which the indication has been printed.

In a process for manufacturing a vehicle rubber tire such as an automobile tire, an indication label is attached to each unvulcanized tire for assisting in management of the quality. After the indication label indicating, for example a production lot, stuck thereto is attached to an unvulcanized raw tire, the raw tire is vulcanized in a mold. Accordingly, the indication label to be used for such a purpose must firmly adhere to the rubber tire and not separate therefrom. In addition, the label must maintain its characteristic as a clear indication without being influenced by heat and pressure applied thereto during the process of vulcanizing the raw tire in the mold.

In order to comply with such a need, various kinds of indication labels for adhesion to a rubber tire have been proposed as disclosed in Japanese Utility Model Publication No. 54-16636, Japanese Patent Publication No. 53-29595, Japanese Utility Model Publication No. 62-3814, and Japanese Patent Publication No. 63-42263.

However, in each of these conventional indication labels for adhesion to a rubber tire, a plastic film such as a transparent polyester film is laminated on a printing layer for intercepting the influence of heat or pressure applied thereto when vulcanizing the raw tire in the mold. Therefore, an indication label must be created under specific conditions before adhering the label by printing an indication, laminating a plastics film over the indication for the protection of the printing and finally die-cutting the labels.

In recent years, management labels having a bar code printed thereon have been used in various fields of industry. It is well known that the most effective way for using these management labels is to apply an indication on a pre-die-cut label during manufacturing. Normally, a thermal transfer printer is used to print the indication on the label.

There is a disadvantage in utilizing the above described method of printing indications during the process of manufacturing of the rubber tire. That is, in printing the indication during the manufacturing process using a thermal transfer printer, thermal transfer ink does not have heat-resistant properties. Thus, a thermal transfer ink layer melts in the process of vulcanizing the raw tire. When the melted ink contacts the metal surface of the vulcanizing mold, the ink tends to be transferred thereto. As a result, the density of the printed image of the indication is reduced; the printed indication is destroyed; or the ink transferred to the metal surface of the vulcanizing mold is re-transferred to the label thereby contaminating the indication and preventing the bar code from being correctly read. In order to protect the printing layer, a plastics film must be manually applied over the pre-die-cut label. However, such application is believed to be disadvantageous as part of the manufacturing process since it increases the time and cost associated with making the tire.

SUMMARY OF THE INVENTION

It is an object of the present invention to provide an indication label for adhering to an unvulcanized raw rubber tire where the label is fixed by vulcanizing the rubber tire using heat and pressure such that the label material can receive an indication printed during a manufacturing process.

In accomplishing this and other objects, according to a first aspect of the present invention, there is provided an indication label for adhesion to an unvulcanized raw rubber tire where the label is fixed by vulcanizing the rubber tire using heat and pressure. The label includes a label base material having a film made of a heat-resistant plastics film, an abrasive surface coating layer made of a hardening resin and filler which is formed on an upper surface of the plastics film, and a rubber adhesive laminated on the lower surface of the plastic film. An indication made of an ink layer formed on the exposed surface of the label base material is disposed on the abrasive surface coating layer.

According to a second aspect of the present invention, there is provided a material for forming the indication label. The material including a label base material made of a heat-resistant plastic film; and an abrasive surface coating layer made of hardening resin and filler for receiving an ink layer on the upper surface of the film; and a rubber adhesive laminated on a lower surface of the plastic film.

Since the indication label to be adhered to the rubber tire and the material of the indication label are constructed as described above, transfer ink permeates into the abrasive surface coating layer during thermal transfer adheres firmly thereto. In addition, because of the rough surface, ink can be prevented from adhering to the metal surface of a mold. Thus, the indication can be prevented from being contaminated.

BRIEF DESCRIPTION OF THE DRAWINGS

This and other objects and features of the present invention will become clear from the following description taken in conjunction with the preferred embodiments thereof with reference to the accompanying drawings, in which.

DETAILED DESCRIPTION OF A PREFERRED EMBODIMENT

Figure 1:
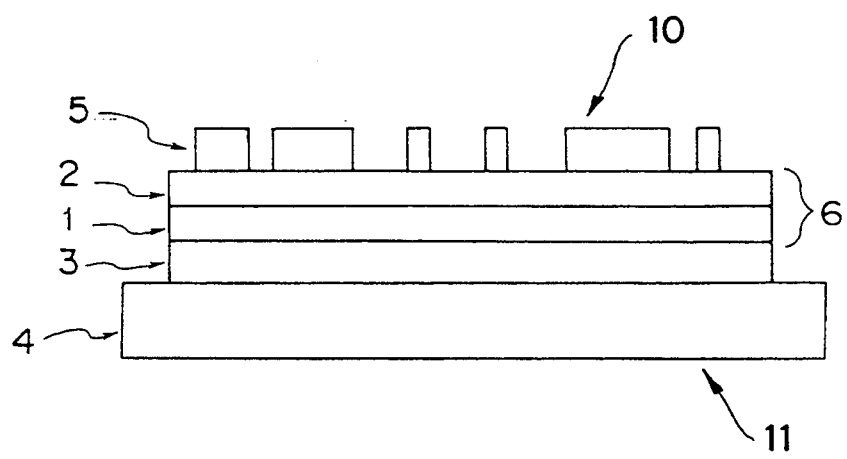
FIG. 1 is a side view showing an indication label to be adhered to a rubber tire according to an embodiment of the present invention.

Before the description of the present invention proceeds, it is to be noted that like parts are designated by like reference numerals throughout the accompanying drawings.

A preferred embodiment of the present invention is described below in detail with reference to FIGS. 1 and 2.

FIG. 1 is a side view schematically showing an indication label to be adhered to a rubber tire according to the embodiment. In FIG. 1, a label base material 6 includes a film 1 made of heat-resistant plastic film such as polyester film and an abrasive surface coating layer 2, made of hardening resin, formed on the upper surface thereof. The indication label has a surface side 10 and a rear surface side 11 (tire side). A release paper 4 is laminated on the lower surface of the base material 6 via a pressure-sensitive rubber adhesive 3. In adhering the label to the tire, the release paper 4 is removed so as to place the adhesive 3 against the surface of the tire.

Figure 2:
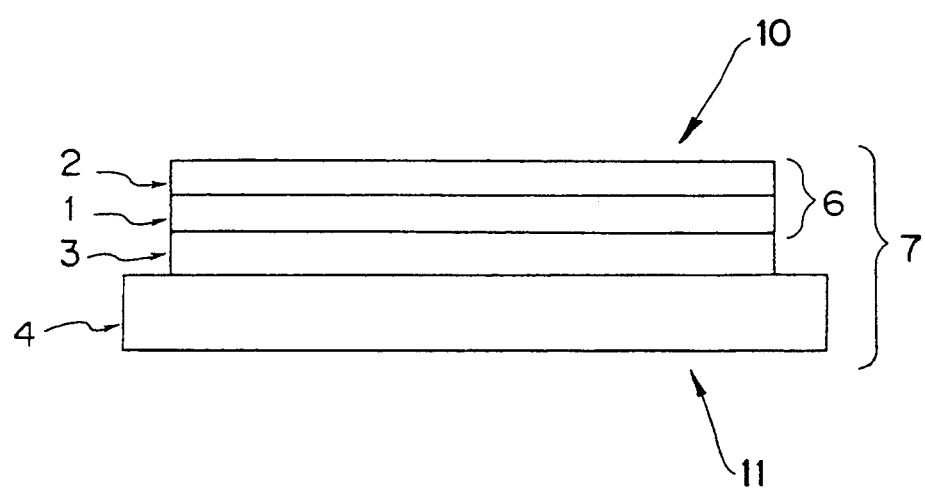
FIG. 2 is a side view showing a label material of an embodiment of the present invention.

In constructing the label material 7 as shown in FIG. 2, the adhesive 3 is formed on the lower surface of the label base material 6 and the release paper 4 is formed on the lower surface of the adhesive 3 as necessary. That is, the label is composed of the label material 7 and a thermal transfer ink layer 5, formed on the upper surface of the label material 7. Reference numeral 5 denotes the thermal transfer ink layer representing an indication such as a bar code printed by a thermal transfer printer and disposed on the upper surface of the label material 7, that is, the abrasive surface coating layer 2 of the label material 7. Thus, after the thermal transfer ink layer 5 is formed on the label material 7, the release paper 4 is removed from the adhesive 3 and then the adhesive 3 of the label material 7 is disposed against the surface of the unvulcanized raw tire. The label is fixed to the rubber tire as a upon vulcanization of the tire as a result of the heat and pressure.

The film 1 is made generally of a heat-resistant plastic film such as polyester, polyimide, or polyetherimide.

The abrasive surface coating layer 2 includes essentially a hardening resin and filler. The preferred surface characteristics include a mean deviation of the profile by stylus type surface roughness measurement in the range of from 0.5 $\mu$ to 3.0 $\mu$, and more favorably, from 1.0 $\mu$ to 2.0 $\mu$, and a maximum height of the profile in the range of from 1 $\mu$ to 20 $\mu$, and more favorably, from 3 $\mu$ to 15 $\mu$.

Various materials may be used for the hardening resin. The following resins may be used: resin having a hardening property itself, for example, melamine resin or silicon resin; acrylic resin of a self-crosslinking type, for example, unsaturated polyester resin, unsaturated alkyd resin, or epoxy resin; resin which does not have a hardening property itself but is hardened by crosslinking with a crosslinking component such as polyisocyanate, melamine resin, or polyamide resin added thereto, for example, acrylic resin such as polyester polyol, polyether polyol, acrylic polyol; alkyd resin; polyurethane resin; saturated polyester resin; and epoxy resin. The hardening resin to be contained in the abrasive surface coating layer 2 is not limited to the above resin, but other resins having a hardening property and satisfying a predetermined heat-resistant property may be used. The hardening method is not limited to heating, but include other conventional hardening methods such as radiation using radioactive energy.

As the filler to be contained in the abrasive surface coating layer 2, titanium white, white carbon (silicon dioxide), clay, calcium carbonate, magnesium carbonate, and barium sulfate can be used. The filler is not limited to these substances, but substances which are added to the hardening resin and then capable of accomplishing a predetermined degree of roughness may be used.

An example of a method for forming the abrasive surface coating layer 2 made of a hardening resin is as follows: 10 to 200 parts by weight of a filler is added to 100 parts by weight of a resin component of Paraloid AT-50 which is an acrylic resin of a self-crosslinking type manufactured by Rohm & Haas Co. that has a self-hardening property. The mixture is applied to a film made of heat-resistant plastic film by using an appropriate method such as a gravure coater. Then, the mixture is dried in a hot-air drying oven at 150° C. for 30 minutes to form the abrasive surface coating layer 2. As another example of a method for forming the abrasive surface coating layer 2, 10 parts by weight of Coronate L which is an isocyanate used as a hardener manufactured by Nihon Polyurethane Kogyo Kabushiki Kaisha and 10 to 20 parts by weight of a filler are added to 100 parts by weight of a resin component of Byron 300 which is saturated polyester resin manufactured by Toyobo Co., Ltd. that does not have a hardening property itself but is hardened by crosslinking with a hardener added thereto. The mixture is applied to a film made of a heat-resistant plastic film using an appropriate method such as gravure coater. Then, the mixture is dried in a hot-air drying oven at 120° C. for 20 minutes to form the abrasive surface coating layer 2.

Favorably, the thickness of the dried abrasive surface coating layer formed as described above ranges from 1 $\mu$ to 20 $\mu$ and more favorably from 5 $\mu$ to 15 $\mu$.

According to the above-described embodiment, since the abrasive surface coating layer 2 is formed on the upper surface of the film 1 made of a heat-resistant plastic film, the surface roughness is preferably adjusted to accept thermal transfer printing so that ink of the thermal transfer ink layer 5 permeates into the external rough surface and adheres firmly thereto. In addition, since the top surface of the label has rough-peaks along the abrasive surface coating layer 2, thermal transfer ink can be prevented from directly contacting the metal surface of the vulcanized mold and adhering thereto without being influenced by heat and pressure used in vulcanizing the rubber tire. The surface roughness of the rough surface coating layer 2 is configured so that the mean deviation of the profile by stylus type surface roughness measurement is in the range of from 0.5 $\mu$ to 3.0 $\mu$, and more favorably, from 1.0 $\mu$ to 2.0 $\mu$, and the maximum height of the profile is in the range of from 1 $\mu$ to 20 $\mu$, and more favorably, from 3 $\mu$ to 15 $\mu$. If the average roughness of the rough surface coating layer 2 is rougher than the recited range, an indication printed by the thermal transfer printer is unclear. If the average roughness of the abrasive surface coating layer 2 is finer than the above range, an indication printed using thermal transfer printing will transfer to the metal surface of the vulcanizing mold and thus the density of the printed indication is low. In addition, the label contacts the same position of the vulcanizing mold as previous labels so that ink which has adhered to the metal surface of the vulcanizing mold transfers on the indication thereby contaminating the label and preventing the bar code from being correctly read.

The present invention is not limited to the above-described preferred embodiment. For example, in another embodiment the release paper 4 may not be formed on the label or the label material.

Although the present invention has been fully described in connection with the preferred embodiments thereof with reference to the accompanying drawings, it is to be noted that various changes and modifications would be apparent to those skilled in the art. Such changes and modifications are to be understood as included within the scope of the present invention as defined by the appended claims unless they depart therefrom.

What is claimed is:

1. An indication label for adhesion to a rubber tire, the label being disposed on an unvulcanized raw rubber tire and then fixed by vulcanizing the rubber tire using heat and pressure, comprising:

a label base material including a heat-resistant plastic film with upper and lower surfaces, and an abrasive surface coating layer of hardened resin and filler formed on the upper surface of the heat-resistant plastic film for receiving an indication formed of an ink layer on an exposed surface of the abrasive surface coating layer, wherein the exposed abrasive surface has a profile with a stylus surface roughness measurement having a mean deviation in the range of between 0.5 $\mu$ to 3.0 $\mu$ and a maximum profile height in the range of between 1 $\mu$ to 20 $\mu$; and a rubber adhesive laminated on the lower surface of the heat-resistant plastic film of the label base material for adhering the label base material to the rubber tire.

2. The indication label for a rubber tire as recited in claim 1, wherein the ink layer is made of thermal transfer ink.

* * * * *